US010315617B2

(12) United States Patent
Franz et al.

(10) Patent No.: US 10,315,617 B2
(45) Date of Patent: Jun. 11, 2019

(54) SEAT BELT RETRACTOR WITH LOAD LIMITING STOP MECHANISM

(71) Applicant: TRW Vehicle Safety Systems Inc., Washington, MI (US)

(72) Inventors: Scott M. Franz, Clinton Township, MI (US); Chhay S. Siev, Macomb, MI (US)

(73) Assignee: TRW VEHICLE SAFETY SYSTEMS INC., Washington, MI (US)

( * ) Notice: Subject to any disclaimer, the term of this patent is extended or adjusted under 35 U.S.C. 154(b) by 323 days.

(21) Appl. No.: 15/228,056

(22) Filed: Aug. 4, 2016

(65) Prior Publication Data

US 2018/0037191 A1 Feb. 8, 2018

(51) Int. Cl.
| | |
|---|---|
| *B60R 22/38* | (2006.01) |
| *B60R 22/34* | (2006.01) |
| *B60R 22/405* | (2006.01) |
| *B60R 22/46* | (2006.01) |
| *B60R 22/28* | (2006.01) |

(52) U.S. Cl.
CPC .......... *B60R 22/38* (2013.01); *B60R 22/3413* (2013.01); *B60R 22/405* (2013.01); *B60R 22/4633* (2013.01); *B60R 2022/287* (2013.01); *B60R 2022/385* (2013.01); *B60R 2022/4647* (2013.01)

(58) Field of Classification Search
CPC ... B60R 22/38; B60R 22/405; B60R 22/3413; B60R 22/4633
See application file for complete search history.

(56) References Cited

U.S. PATENT DOCUMENTS

| | | | |
|---|---|---|---|
| 4,322,046 A | 3/1982 | Tanaka et al. | |
| 5,794,877 A | 8/1998 | Ono et al. | |
| 5,904,371 A | 5/1999 | Koning | |
| 5,967,441 A | 10/1999 | Kohlndorfer et al. | |
| 6,237,869 B1 | 5/2001 | Ahn | |
| 6,305,633 B1 * | 10/2001 | Asagiri | B60R 22/38 |
| | | | 242/383.2 |
| 8,042,835 B2 | 10/2011 | Bieg et al. | |

(Continued)

FOREIGN PATENT DOCUMENTS

JP 2006213102 8/2006

*Primary Examiner* — Sang K Kim
(74) *Attorney, Agent, or Firm* — Tarolli, Sundheim, Covell & Tummino LLP

(57) ABSTRACT

A seat belt retractor comprises a rotatable spool on which seat belt webbing is wound. The spool is rotatable in a webbing withdrawal direction and an opposite webbing retraction direction. The seat belt retractor also comprises a pretensioner actuatable to rotate the spool in the webbing retraction direction and a load-limiting system to limit a load applied to a vehicle occupant by the seat belt webbing. The load-limiting system includes a torsion bar mounted such that the torsion bar is twisted when a load in excess of a predetermined load is applied to the spool in the webbing withdrawal direction by the seat belt webbing. The bad-limiting system also includes a stop assembly actuatable to limit rotation of the spool in the webbing withdrawal direction to a predetermined number of rotations while the torsion bar is being twisted. The stop assembly is actuated upon actuation of the pretensioner.

15 Claims, 9 Drawing Sheets

(56) References Cited

U.S. PATENT DOCUMENTS

| | | |
|---|---|---|
| 8,123,154 B2 | 2/2012 | Singer |
| 8,430,350 B2 * | 4/2013 | Hiramatsu ............ B60R 22/405 |
| | | 242/374 |
| 2003/0132334 A1 | 7/2003 | Koning et al. |
| 2005/0127228 A1 | 6/2005 | Holbein et al. |
| 2006/0144983 A1 * | 7/2006 | Kitazawa ............ B60R 22/4633 |
| | | 242/374 |
| 2008/0203808 A1 * | 8/2008 | Yoshioka ............... B60R 22/405 |
| | | 297/478 |
| 2008/0210802 A1 * | 9/2008 | Sumiyashiki ......... B60R 22/405 |
| | | 242/379.1 |
| 2015/0108263 A1 * | 4/2015 | Suminaka ............. B60R 22/405 |
| | | 242/379.1 |
| 2015/0224959 A1 * | 8/2015 | Suminaka ........... B60R 22/4633 |
| | | 242/383.4 |
| 2016/0059824 A1 * | 3/2016 | Shigesato ........... B60R 22/4633 |
| | | 242/374 |
| 2017/0129452 A1 | 5/2017 | Uchibori |

* cited by examiner

SEAT BELT RETRACTOR WITH LOAD LIMITING STOP MECHANISM

FIELD OF THE INVENTION

The present invention relates to a seat belt retractor with both pretensioning capability and load limiting capability and, more particularly, to a seat belt retractor with a pretensioner and with load limiting capability that begins with actuation of the pretensioner and ends after a predetermined number of rotations of the retractor spool following actuation of the pretensioner.

BACKGROUND OF THE INVENTION

Seat belt retractors typically have a spool on which seat belt webbing is wound and from which webbing may be unwound, for example, when a vehicle occupant extends the seat belt webbing around the occupant's body. In response to a vehicle crash condition, the spool is locked against unwinding so that the seat belt webbing will restrain the vehicle occupant in a vehicle seat. To enhance the performance of seat belt retractors over a range of occupant sizes or weights and over a range of vehicle crash conditions, pretensioners have been added to seat belt retractors. Similarly, torsion bars have been added to seat belt retractors.

SUMMARY OF THE INVENTION

The present invention is directed to a seat belt retractor with both pretensioning capability and load limiting capability and, more particularly, to a seat belt retractor with a pretensioner and with load limiting capability that begins with actuation of the pretensioner and ends after a predetermined number of rotations of the retractor spool following actuation of the pretensioner.

In accordance with an embodiment of the present invention, a seat bolt retractor comprises a rotatable spool on which seat belt webbing is wound. The spool is rotatable in a webbing withdrawal direction and an opposite webbing retraction direction. The seat belt retractor also comprises a pretensioner actuatable to rotate the spool in the webbing retraction direction and a load-limiting system to limit a load applied to a vehicle occupant by the seat belt webbing. The load-limiting system includes a torsion bar mounted such that the torsion bar is twisted when a load in excess of a predetermined load is applied to the spool in the webbing withdrawal direction by the seat belt webbing. The load-limiting system also includes a stop assembly actuatable to limit rotation of the spool in the webbing withdrawal direction to a predetermined number of rotations while the torsion bar is being twisted. The stop assembly is actuated upon actuation of the pretensioner.

In accordance with another embodiment of the present invention, a method is provided for limiting a load applied to a vehicle occupant by seat belt webbing in a vehicle crash condition. The method comprises the steps of (a) winding seat belt webbing on a rotatable spool of a seat belt retractor and (b) actuating a pretensioner to rotate the spool in a webbing retraction direction in response to an actual or anticipated crash event involving a vehicle in which the seat belt retractor is mounted. The method also comprises the steps of (c) twisting a torsion bar; and (d) actuating a stop assembly upon actuation of the pretensioner to limit rotation of the spool in the webbing withdrawal direction to a predetermined number of rotations while the torsion bar is being twisted.

BRIEF DESCRIPTION OF THE DRAWINGS

The foregoing and other features and advantages of the present invention will become apparent to one skilled in the art upon consideration of the following description of the invention and the accompanying drawings, in which.

DETAILED DESCRIPTION

Figure 3:
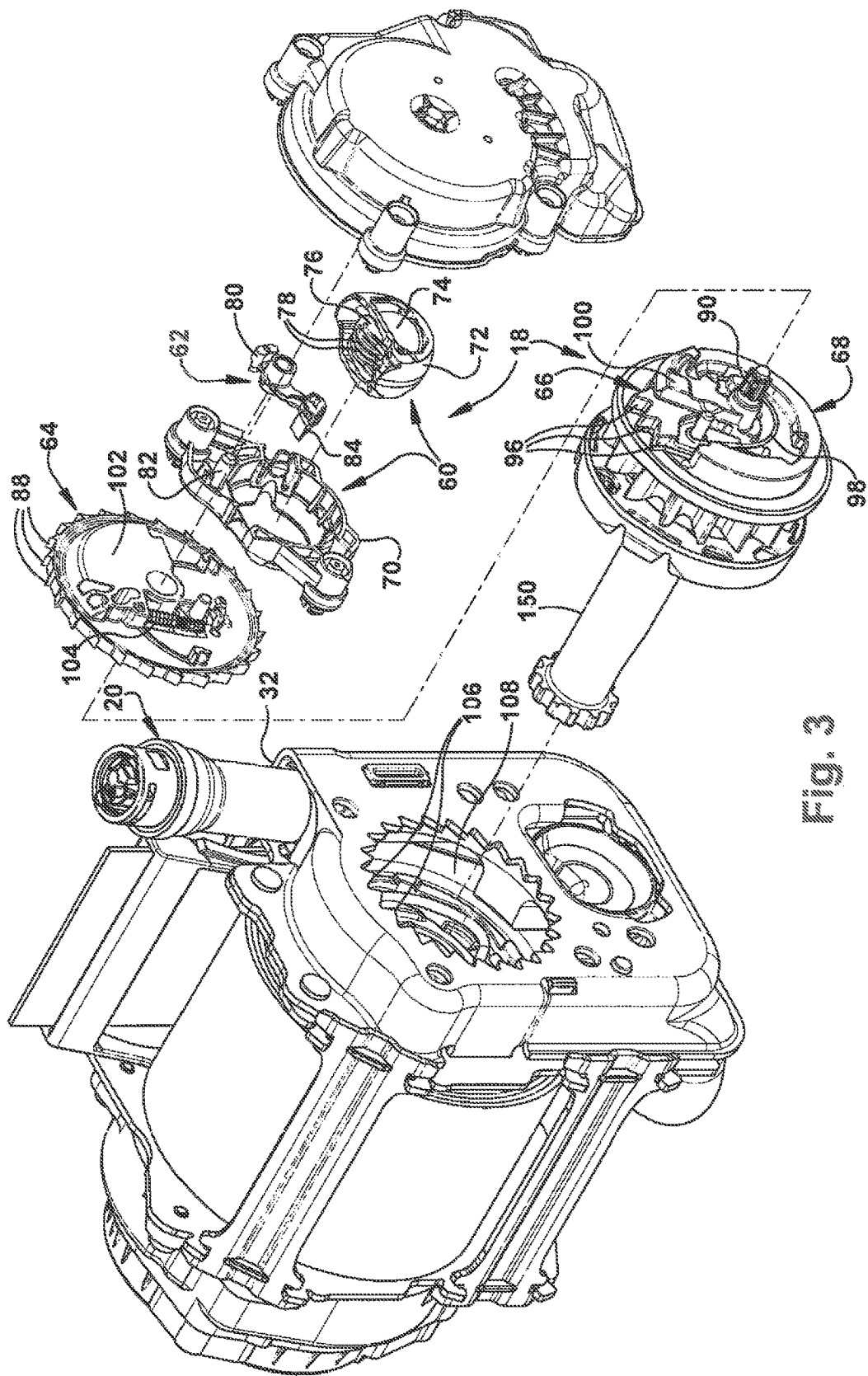
FIG. 3 is an exploded view of one side of the seat belt retractor of FIG. 1.
Figure 4:
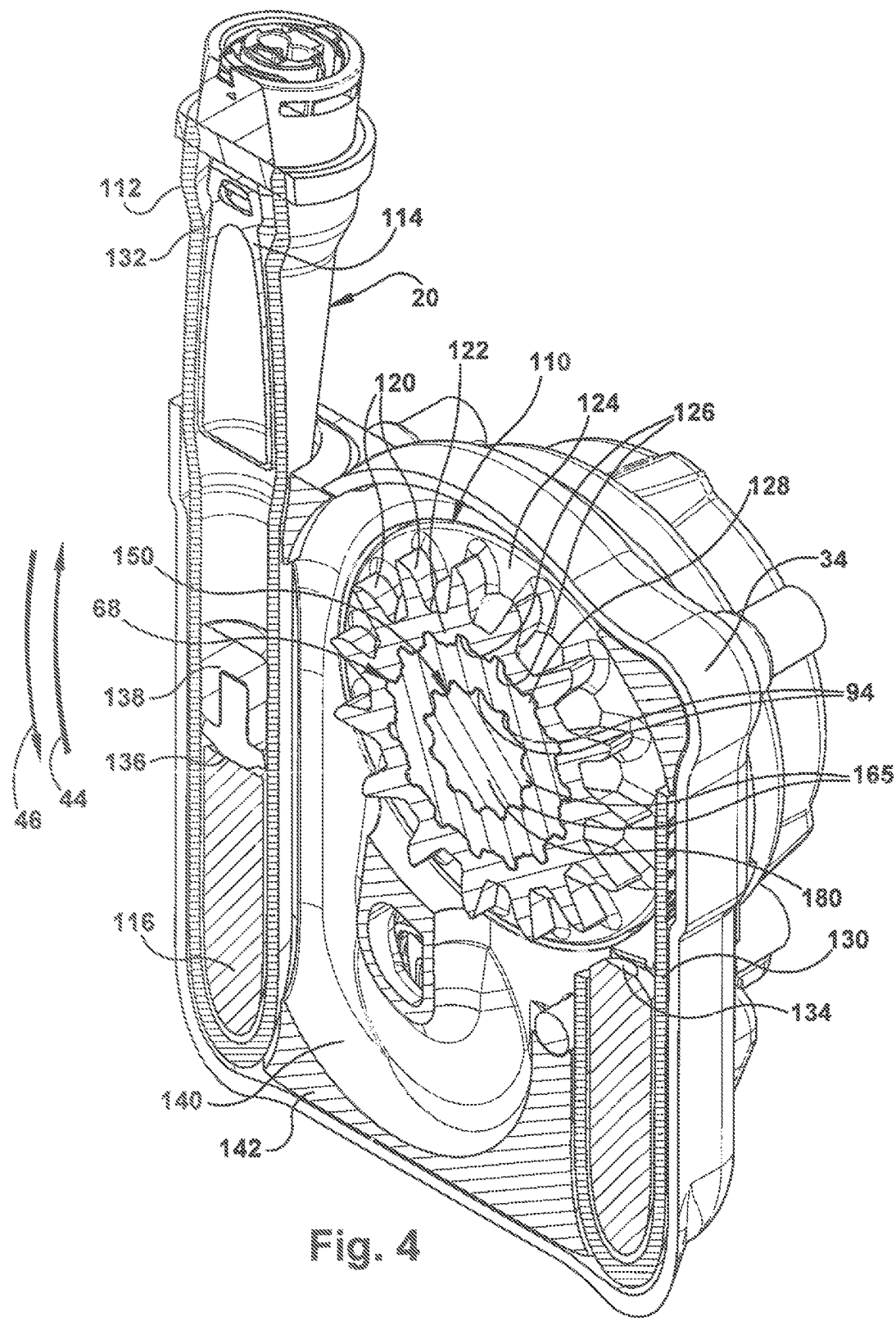
FIG. 4 is a sectional view through the side of the seat belt retractor shown in FIG. 3.
Figure 5:
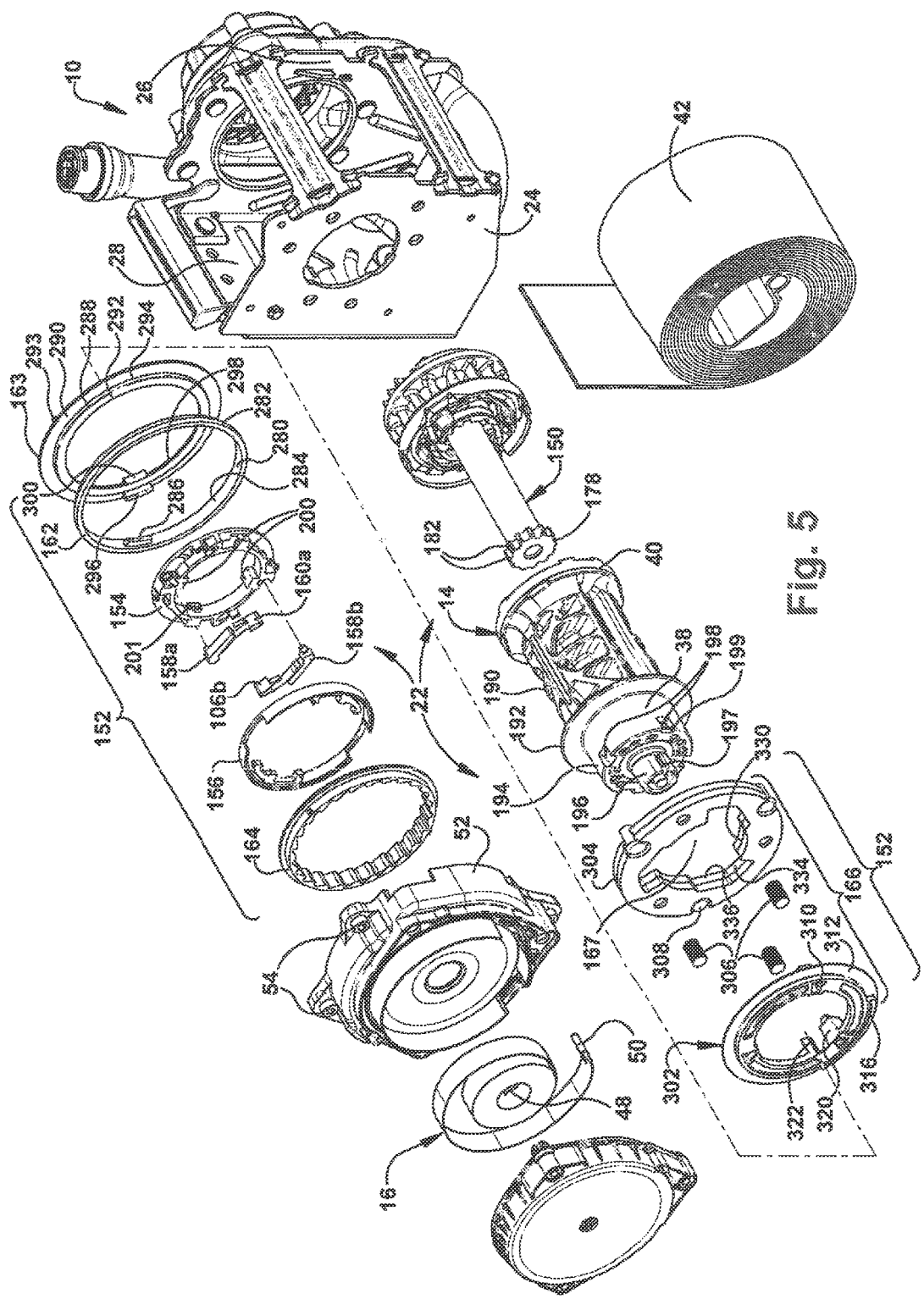
FIG. 5 is an exploded view of the opposite side of the seat belt retractor of FIG. 1.

FIGS. 1 to 9 illustrate a seat belt retractor 10, in accordance with an example of the present invention. The seat belt retractor 10 comprises a frame 12, a spool 14 (FIG. 5), a rewind spring 16 (FIG. 5), an inertia locking system 18 (FIG. 3), a pretensioner 20, and a load limiting system 22 (FIG. 5). As will be explained in greater detail below, the inertia locking system 18 and the pretensioner 20 are connected to the spool 14 through a torsion bar 150 that is a component of the bad limiting system 22.

The frame 12 is formed of metal or another strong end relatively rigid material. The frame 12 includes two side walls 24 and 26, which are laterally spaced apart from one another. The side walls 24 and 26 are joined by a base wall 28 to form a U-shaped structure. Secured to the side wall 26, on a surface 30 of the side wall 28 presented away from the side wall 24, is a supplements frame member 32, which is also formed of metal or another strong and relatively rigid material. An outer peripheral portion 33 of the supplemental frame member 32 contacts the side wall 26. A bowl-shaped major portion 34 of the supplemental frame member 32, which is formed in one piece with the outer peripheral portion 33, is spaced away from the side wall 26 and receives other components of the seat belt retractor 10, as will become apparent. To help ensure that the frame 12 maintains its intended shape during a crash condition of a vehicle (not shown) in which the retractor 10 is installed or mounted, two cross-braces or brace members 36 extend from one side wall 24 to the other side wall 26 at locations opposite the base wall 28 and are securely attached to both side walls.

Figure 1:
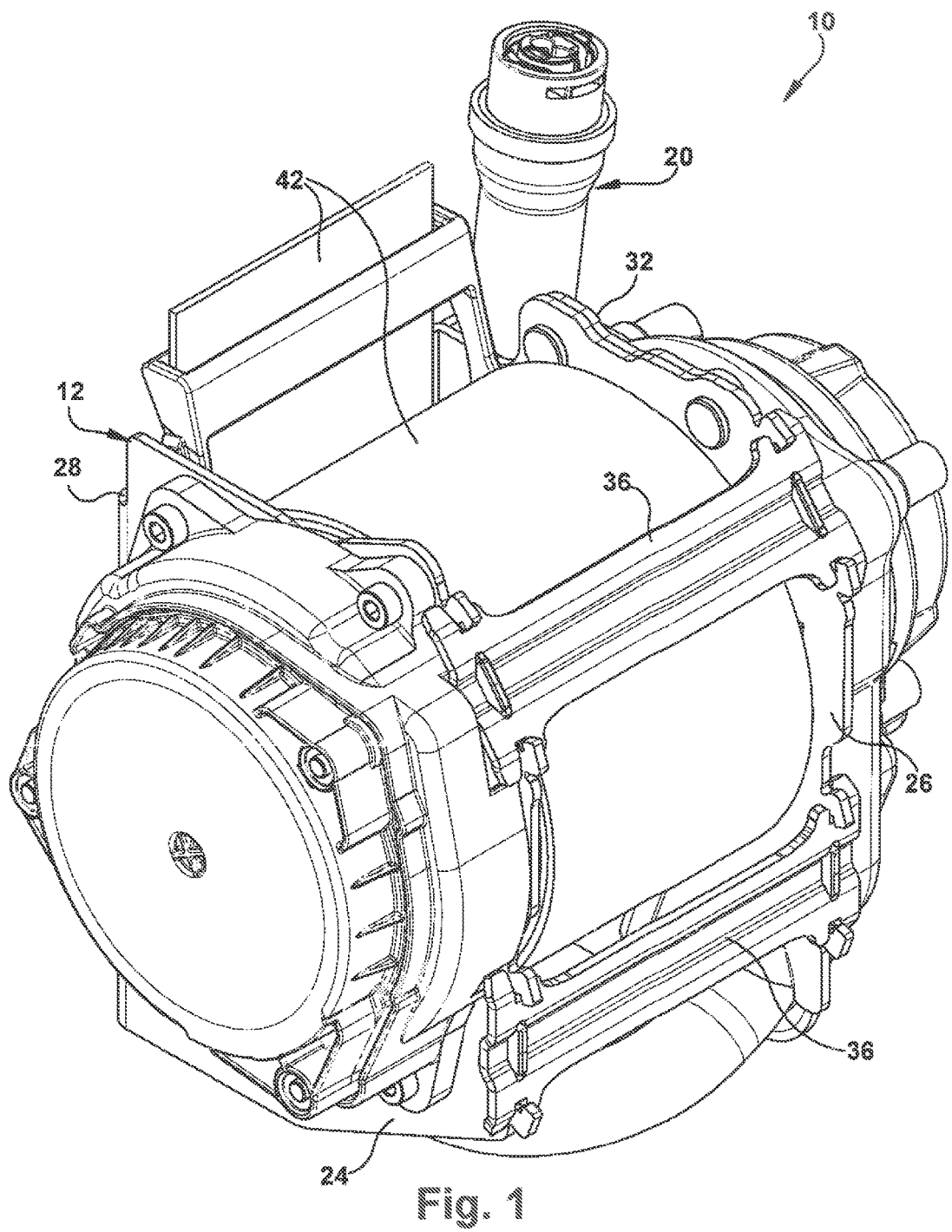
FIG. 1 is a perspective view of a seat belt retractor in accordance with an embodiment of the present invention.
Figure 2:
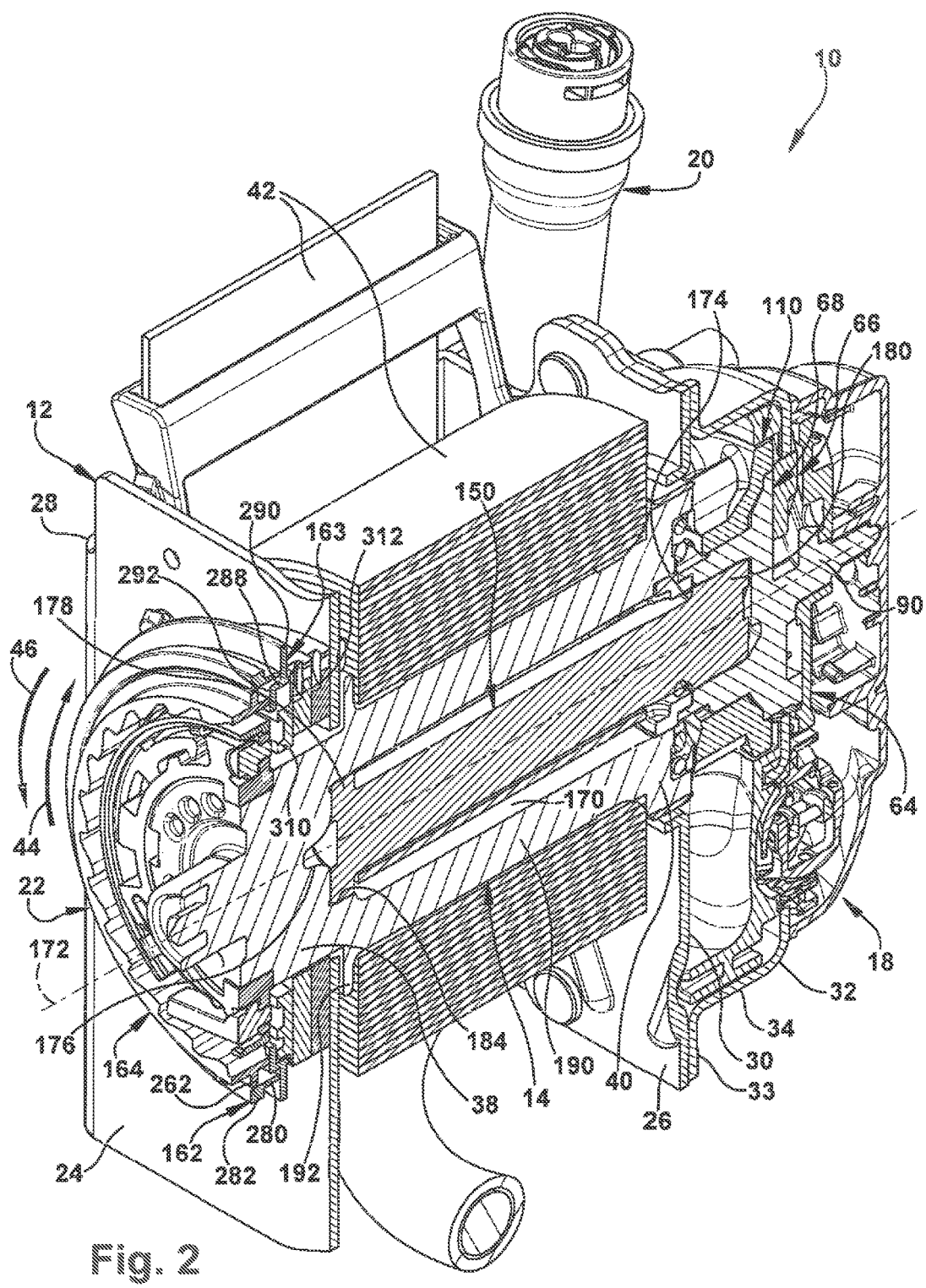
FIG. 2 is a sectional view of the seat belt retractor of FIG. 1.

The spool 14 is mounted in the frame 12 for rotation relative to the frame. As can be seen in FIG. 2, the spool 14 extends from one side wall 24 of the frame 12 to the other side wall 26 and is spaced apart from the base wall 28. A first end portion 33 of the spool 14 is rotatably supported in or on the side wall 24. A second end portion 40 of the spool 14, which is spaced apart from the first end portion 33 along the length of the spool, is rotatably supported in or on the side wall 26. The rotatable support or mounting of the spool 14 in the frame 12 permits a length of seat belt webbing 42 to be wound on and unwound from the spool. More particularly, the spool 14 is rotatable in a webbing withdrawal direction 44 and an opposite webbing retraction direction 46. The rewind spring 16 is attached to the first end portion 38 of the spool 14 so as to bias the spool in the webbing retraction direction 46. Specifically, a radially inner end portion 48 of the rewind spring 16 is attached to the first end portion 38 of the spool 14. An opposite radially outer end portion 50 of the rewind spring 16 is attached to a housing 52, which is secured by fasteners 54 to the side wall 24 of the frame 12.

The inertia locking system 18 is disposed adjacent the side wall 26 and supplemental frame member 32 of the frame 12 and adjacent the second end portion 40 of the spool 14. The inertia locking system 18 comprises an inertia sensor 60, a look-up lever 62, an inertia disc 64, a locking pawl 66, and a spool disc 68.

The inertia sensor 60 (FIG. 3) includes a sensor housing 70, which may be formed of plastic, secured to the supplemental frame member 32. Mounted on the sensor housing 70 is a weight support 72, which may also be formed of plastic and which is shaped generally like a cup or bowl. The weight support 72 receives an inertia weight 74, which is formed of steel and which is in the shape of a ball. A sensor lever 76, which may be formed of plastic, is pivotally mounted at one end on the weight support 72. The sensor lever 76 rests on the inertia weight 74. Ribs 78 project upwardly, as viewed in FIG. 3, from a surface of the sensor lever 76 presented away from the inertia weight 74. The lock-up lever 62 is pivotally mounted adjacent one end 80 on a pin 82 that projects from the sensor housing 70. The opposite end 84 of the lock-up lever 82 rests on the upstanding ribs 78 of the sensor lever 76. Movement of the inertia weight 74 in and relative to the weight support 72 will cause the sensor lever 78 to pivot about its end that is mounted on the weight support. Such pivoting of the sensor lever 76 will cause upward movement of the ribs 78 and consequent upward pivoting of the lock-up lever 62 about the pin 82. Movement of the inertia weight 74 in and relative to the weight support 72 may result from deceleration of a vehicle (not shown) in which the retractor 10 is mounted.

The inertia disc 64 is connected to the spool 14 through the spool disc 68 and the load limiting system 22, including the torsion bar 150. Under normal circumstances, the inertia disc 64 rotates with the spool 14. The inertia disc 64 can, however, rotate relative to the spool 14 in a vehicle crash condition, as will be explained below. Ratchet teeth 83 project radially outward from the outer periphery of the inertia disc 64. The ratchet teeth 88 are normally spaced away or apart from the end 84 of the lock-up lever 62. Upon sufficient upward pivoting of the end 84 of the lock-up lever 62, however, the end 84 will come into contact with and engage the ratchet teeth 88. The ratchet teeth 88 have faces that are sloped such that the ratchet teeth can pass by the end 84 of the lock-up lever 62 if the inertia disc rotates in the webbing retraction direction 46. The engagement of the end 84 of the lock-up lever 62 with the ratchet teeth 88 will, however, prevent the inertia disc 64 from rotating in the webbing withdrawal direction 44.

As can be seen in FIG. 2, the inertia disc 64 is mounted on the spool disc 68 and, more particularly, on a shaft portion 90 of the spool disc, which projects in a direction axially away from the remainder of the spool disc 68. The spool disc 63 is mounted on a second end portion 180 of the torsion bar 150. As can be seen in FIG. 4, splines 165 project radially outwardly from the torsion bar 150 and engage grooves 94 formed in a radially inner surface of the spool disc 68. The spool disc 68 will thus always rotate together with the second end portion 180 of the torsion bar 150.

The locking pawl 66 is pivotally mounted at one end on the spool disc 68. At the other end of the locking pawl 66 are a plurality of looking teeth 96. The locking teeth 96 are positioned adjacent the radially outer periphery of the spool disc 68. A lock pawl spring 98 biases the locking pawl 66 to pivot in a radially inward direction away from the radially outer periphery of the spool disc 68.

The spool disc 68 and the inertia disc 64 have interfitting portions 100 and 102, respectively, which are contoured and dimensioned such that the interfitting portion 100 of the spool disc 68 fits into the interfitting portion 102 of the inertia disc when the inertia disc is mounted on the shaft portion 90 of the spool disc. The interfitting portion 102 of the inertia disc 64 generally resembles a sector of a circle. The interfitting portion 100 of the spool disc 68 also generally resembles a sector of a circle, but with a smaller central angle and a shorter arc than the interfitting portion 102. The interfitting portion 100 thus is able to move through a limited range of rotational movement relative to the interfitting portion 102.

In normal operation of the retractor 10, the interfitting portion 100 of the spool disc 68 is positioned relative to the interfitting portion 102 of the inertia disc 64 in the orientations shown in FIG. 3. This relative positioning of the interfitting portions 100 and 102 is maintained during normal rotation of the spool disc 68 and the inertia disc 64 with the spool 14. If, however, rotation of the inertia disc 64 is restrained by, for example, the lock-up lever 62 or if the spool disc 63 is accelerated relative to the inertia disc by, for example, rapid withdrawal of the seat belt webbing 42 and consequent acceleration of the spool 14, the interfitting portion 100 of the spool disc will tend to move in a counter-clockwise direction, as viewed in FIG. 3, relative to the interfitting portion 102 of the inertia disc 64. As a result of such relative movement, the locking pawl 66 will press against one end of an inertia disc spring 104, which is a coil spring carried by the inertia disc 64. The inertia disc spring 104, when subjected to the pressure of the locking pawl 66, will tend to be compressed and will resist such compression with a spring force that will urge the locking pawl to pivot relative to the spool disc 68 so that the locking teeth 96 of the locking pawl move outward of the radially outer periphery of the spool disc.

Upon sufficient outward movement, the locking teeth 96 will engage frame teeth 106 that project radially inward about a central opening 108 in the supplemental frame member 32. Almost immediately after the locking teeth 98 engage the frame teeth 108, the interfitting portion 100 of the spool disc 68 will reach the end of its possible movement or travel in a counter-clockwise direction, as viewed in FIG. 3, relative to the interfitting portion 102 of the inertia disc 64, and rotational movement of the spool disc 68 and the inertia disc 64 in the webbing withdrawal direction 44 will be blocked. Further, as a result of the inter-engagement between the grooves 94 in the spool disc 68 and the splines 165 on the torsion bar 150, rotation of the end portion 180 of the torsion bar 150 in the webbing withdrawal direction 44 will also be blocked.

If rotational movement in the webbing withdrawal direction 44 of the inertia disc 64, the spool disc 68, and the second end portion 100 of the torsion bar 150 is blocked due to operation of the inertia looking system 18, the effect on the spool 14 will depend on the event that caused the foregoing rotational movement to be blocked. If, for example, the vehicle (net shown) in which the retractor 10 is mounted is involved in a low speed collision that results in forward movement of a vehicle occupant and consequent loading of the seat belt webbing 42, or if a vehicle occupant simply moves too quickly and thereby applies a load on the seat belt webbing, neither the pretensioner 20 nor the load limiting system 22 will be actuated. Rotational movement of the spool 14 in the webbing withdrawal direction 44 will be blocked due to the connection, which is described below, between the torsion bar 150 and the spool. If, on the other hand, the vehicle (not shown) in which the retractor 10 is mounted is involved in a higher speed collision in which loads on the vehicle and/or a vehicle occupant exceed one or more predetermined thresholds, the pretensioner 20 and/or the load limiting system 22 will be actuated, and rotational movement of the spool 14 will be affected as described below.

If the loads on the vehicle and/or a vehicle occupant exceed or are anticipated to exceed one or more predetermined thresholds, the pretensioner 20 will be actuated. The pretensioner 20 operates to remove slack from the seat belt webbing 42 wound on the spool 14 and also to pull the seat belt webbing close to and against a vehicle occupant (not shown). Actuation of the pretensioner 20 may be in response to a signal from a crash sensor (not shown), such as an accelerometer, mounted on a forward part of a vehicle (not shown) indicating a vehicle crash condition, a signal from a forward-looking radar unit or camera (not shown) mounted in a vehicle indicating an impending and likely unavoidable vehicle crash condition, a load applied to the seat belt webbing by the body of a vehicle occupant, or any other suitable indicator of an actual or anticipated vehicle crash condition.

The pretensioner 20 may have any one of many different designs and constructions that are commercially available. As shown in FIG. 4, however, the pretensioner 20 is an assembly that comprises a vaned turbine wheel 110, a tube 112, a micro gas generator 114, and an elongated flexible member or snake 116 received in the tube. The turbine wheel 110 is formed of a metal, such as steel, or another strong, relatively rigid material. The turbine wheel 110 is either formed in one piece with or fixed or immovably connected to the spool disc 66 so that the turbine wheel and the spool disc rotate together. As shown in FIG. 4, the turbine wheel 110 includes a plurality of radially outwardly projecting turbine blades or vanes 120 arrayed around the radially outer periphery of a hub portion 122 of the turbine wheel. Adjacent to and along one side of each of the vanes 120 is a radially outwardly projecting rim 124 that has a greater radial extent than the vanes. Grooves 126 are formed in a radially inner surface of the hub portion 122 of the turbine wheel 110 and receive splines 128 formed on a radial cuter surface of the spool disc 68. The turbine wheel 110 will thus always rotate together with the spool disc 68, which, in turn, always rotates together with the second end portion 180 of the torsion 150.

The tube 112 is formed of a metal, such as steel, or another material capable of withstanding high gas pressures. The tube 112 has a first end portion 130 located adjacent the vanes 120 of the turbine wheel 110 and the supplemental frame member 32 and spaced away from the base wall 28 of the frame 12. The tube 112 has an opposite second end portion 132 located adjacent the base wall 28 of the frame 12 and the supplemental frame member 32 and spaced apart from the first end portion 130 across the diameter of the turbine wheel 110. Mounted in the second end portion 132 of the tube 112 is the micro gas generator 114.

The elongated flexible member or snake 116 has one end 134 located in the first end portion 130 of the tube 112 and an opposite second end 136 located near to, but spaced away from the second end portion 132 of the tube 112 and the micro gas generator 114. The snake 116 is formed of a material that is flexible, resists being compressed, and can be dug into by the blades or vanes 120 of the turbine wheel 110. One such material is nylon 6. The elongated flexible member or snake 116 may be one continuous piece of material or several separate pieces arranged in end-to-end abutting relationship. The snake 116 has an outer diameter dimensioned to fit closely within the tube 112 to help reduce the possibility of gas generated by the micro gas generator 114 passing along the tube between the inner surface of the tube and the snake. An optional supplemental plug or sealing element 138 may be positioned at the second end 136 of the snake 116 between the micro gas generator 114 and the snake to help further prevent gas from passing along passing along the tube 112 between the inner surface of the tube and the snake. Between the micro gas generator 114 and the turbine wheel 110, the tube 112 may have any outer shape or configuration as may required, for example, to facilitate packaging the retractor 10 in a particular vehicle (not shown), provided that the elongated flexible member or snake 116 can follow the shape or configuration to move through the tube from adjacent the second end portion 132 to the first end portion 130.

When the pretensioner 20 is actuated, an electrical signal is sent to the micro gas generator 114. The signal causes the micro gas generator 114 to ignite and to produce or generate gas under pressure. The gas from the micro gas generator 114 pushes on the adjacent second end 136 of the elongated flexible member or snake 116, either directly or through the supplemental plug or sealing element 138, in response to the gas pressure, the elongated flexible member or snake 116 travels lengthwise along the tube 112 and out of the first end portion 130 of the tube, where the snake contacts one of the vanes 120 of the turbine wheel 110. The elongated flexible member or snake 116 pushes the vane 120 on the turbine wheel 110, which causes the turbine wheel to rotate in the webbing retraction direction 46. As the turbine wheel 110 rotates, the next vane 120 on the turbine wheel contacts the elongated flexible member or snake 116, digs into the outer surface of the elongated flexible member or snake, and is pushed along by the snake, which causes further rotation of the turbine wheel in the webbing retraction direction 46. Rotation of the turbine wheel 110 is transmitted to the spool 14 via the spool disc 68, the second end portion 180 of the torsion bar 150, and the remainder of the load limiting system 22 and thereby causes the spool 14 to rotate in the webbing retraction direction 46 to wind up the seat belt webbing 42 on the spool. The winding rotation of the spool 14 effectively reduces or eliminates slack in the seat belt webbing 42 wound on the spool and also pulls the seat belt webbing closely and tightly against a vehicle occupant (not shown).

As the elongated flexible member or snake 116 moves with the turbine wheel 110, the snake is no longer constrained by the tube 112 but is nonetheless contained by the rim 124 of the turbine wheel 110 and the bowl-shaped major portion 34 of the supplemental frame member 32. After the elongated flexible member or snake 116 has moved approximately 180° around the turbine wheel 110, the end 134 and the adjacent portion of the snake pass out of contact with the vanes 120 and are pushed into a curved recess 140 formed in a plastic holder 142 that fits inside the bowl-shaped major portion 34 of the supplemental frame member 32.

Actuation of the pretensioner 20 actuates the load limiting system 22, as will be explained below. The load limiting system 22 comprises the torsion bar 150 and a stop assembly 152 that limits twisting of the torsion bar and that consequently limits rotation of the spool 14 while the torsion bar is being twisted. The stop assembly 152 comprises a hub member 154, an inertia member 156 releasably connected to the hub member, actuation pawls 158a and 158b pivotally mounted on the hub member, leaf springs 160a and 160b resiliently biasing the actuation pawls 158a and 158b in a radially outward direction relative to the hub member, first and second count rings 162 and 163, a count actuation member 164, and a locking mechanism 166.

As can best be seen in FIG. 2, the torsion bar 150 is coaxial with the spool 14 and extends lengthwise in an axially extending bore 170 formed in and along a centerline or central longitudinal axis 172 of the spool. More specifically, the bore 170 extends longitudinally within the spool 14 and entirely through the second end portion 40 of the spool 14, terminating in an open and 174 at an end surface of the spool. The bore 170 does not, however, extend entirely through the first end portion 38 of the spool 14, but rather terminates in a closed end 176 adjacent the first end portion 38 of the spool and at about the point where the spool passes through the side wall 24 of the frame 12. The torsion bar 150 is an elongated, generally cylindrical member with an enlarged first end portion 178 and an enlarged second end portion 180. The first end portion 178 includes outwardly extending splines 182 that engage grooves (not shown) formed adjacent the closed end 176 of the bore 170 in a surface 184 of the spool 14 that defines the bore. The second end portion 180 of the torsion bar 150 projects beyond the open end 174 of the bore 170 and the side wall 26 of the frame 12.

As previously described, the second end portion 180 of the torsion bar 150 includes outwardly extending splines 165 that engage grooves 94 formed in a radially inner surface of the spool disc 68. Because of the engagement between the splines 182 of the torsion bar 150 and the grooves (not shown) in the surface 184 of the spool 14 and because of the engagement of the splines 165 of the torsion bar and the grooves 94 of the spool disc 68, the spool disc will rotate with the spool unless the torsion bar is being twisted. The turbine wheel 110 and the inertia disc 64, both of which are mounted on and connected with the spool disc 68, will likewise rotate with the spool 14.

The torsion bar 150 is formed of a material that will maintain an unflexed condition throughout a predetermined range of torque loads applied to the torsion bar. If a torque load exceeding a predetermined torque threshold is applied to the torsion bar 150, however, the torsion bar will begin to twist. For example, if rotational movement in the webbing withdrawal direction 44 of the inertia disc 64, the spool disc 68, and the second end portion 180 of the torsion bar 150 is blocked due to operation of the inertia locking system 18, and if the vehicle (not shown) in which the retractor 10 is mounted is involved in a higher speed collision in which loads on the vehicle and/or a vehicle occupant exceed one or more predetermined thresholds, the seat belt webbing 42 may apply a torque load exceeding the predetermined torque threshold to the torsion bar through the spool 14 and the first end portion 178 of the torsion bar. With the torque load exceeding the predetermined torque threshold being applied to the torsion bar 150, the torsion bar will begin to twist, with the first end portion 178 rotating relative to the second end portion 180, thereby permitting the spool 14 to rotate with the first end portion 178 in the webbing withdrawal direction 44 and also permitting the seat belt webbing 42 to unwind or pay out from the spool.

In the design of a seat belt system for any given vehicle, it may be desirable to limit either or both the loads applied to a vehicle occupant by the seat belt system in a crash condition and the webbing payout in a crash condition, and it may also be desirable to avoid having a torsion bar, such as the torsion bar 150, twist until it fractures or fails. The components of the stop assembly 152 of the bad limiting system 22 are configured and dimensioned to permit the foregoing objectives to be achieved by limiting the extent to which the torsion bar 150 is able to twist. The stop assembly 152, when actuated, permits a predetermined amount of relative rotation between the first end portion 178 of the torsion bar 150 and the second end portion 180. More particularly, when rotational movement in the webbing withdrawal direction 44 of the inertia disc 64, the spool disc 68, and the second end portion 180 of the torsion bar 150, is blocked due to the locking teeth 96 on the locking pawl 66 of the inertia locking system 18 engaging the frame teeth 106 of the supplemental frame member 32, the stop assembly 152 will permit a predetermined amount of relative rotation between the spool 14, together with the first end portion 178 of the torsion bar 150, which is connected to the spool, and the frame 12. The stop assembly 152 limits the foregoing relative rotation by being connected to the first end portion 38 of the spool 14 and to the side wall 24 of the frame 12.

As previously described, the spool 14 extends between the side walls 24 and 26 of the frame 12. The spool 14 is generally cylindrical in shape and generally symmetrical about its central longitudinal axis 172. The first end portion 38 of the spool 14 is spaced apart from the second end portion 40 of the spool by a cylindrical belt-receiving portion 190 of the spool on which the seat belt webbing 42 is wound. The second end portion 40 of the spool 14 has a larger outer diameter than the belt-receiving portion 190 to help retain the seat belt webbing 42 on the belt-receiving portion. Between the belt-receiving portion 100 of the spool 14 and the first end portion 38 of the spool is an outwardly projecting annular flange portion 192 of the spool that also helps retain the seat belt webbing 42 on the belt-receiving portion. The seat belt webbing 42 is thus wound on the belt-receiving portion 190 of the spool 14 between the flange portion 192 and the second end portion 40 of the spool. The flange portion 192 of the spool 14 is located between the side walls 24 and 26 of the frame 12, but is closely adjacent the side wall 24. The first end portion 38 of the spool 14 extends through the side wall 24 of the frame 12.

The first end portion 38 of the spool 14 has a large diameter outer circumferential surface 194 adjacent the flange portion 192 of the spool 14 and a smaller diameter outer circumferential surface 196 that is spaced apart from the flange portion 192 by the length of the large diameter outer circumferential surface 194. A slot 19 is formed in the smaller diameter outer circumferential surface 196, which receives the radially inner end portion 48 of the rewind spring 16. The stop assembly 152 is mounted around the large diameter outer circumferential surface 194. More specifically, the annular locking mechanism 166, which has a central opening 167, surrounds the large diameter outer circumferential surface 194 adjacent the side wall 24 of the spool. The first and second count rings 162 and 163, which are annular or ring-like in shape, are disposed around the large diameter outer circumferential surface 194 at locations partially overlapping the locking mechanism 166 and partially axially farther away from the side wall 24 than the looking mechanism 166. The count actuation member 164, which is annular or ring-like in shape, is disposed around the large diameter outer circumferential surface 194 at a location axially farther away from the side wall 24 than the second count ring 163 and radially within the first count ring 162. The hub member 154 and the inertia member 156, which are also annular or ring-like in shape, are smaller in diameter than the count actuation member 164 and fit radially within the count actuation member.

Figure 6:
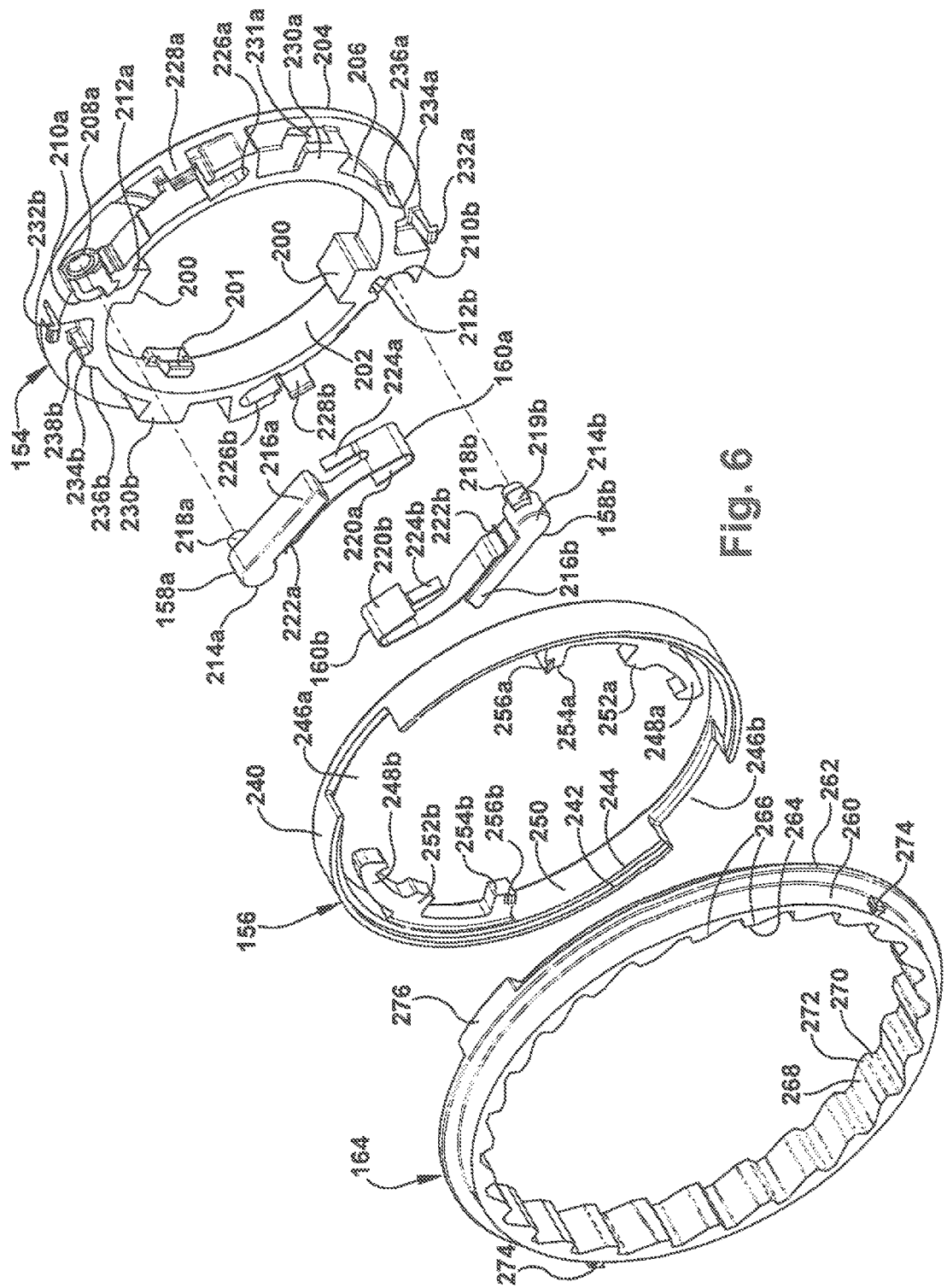
FIG. 6 is an enlarged view of certain components shown in FIG. 5.

To connect the stop assembly 152 to the first end portion 36 of the spool 14, four equally spaced apart, rectangular notches 198 are formed in the large diameter outer circumferential surface 194 of the spool adjacent the smaller diameter outer circumferential surface 196. Two of the notches 198, which are diametrically opposite one another, receive two rectangular tabs 200 (FIG. 6) that project radially inward at diametrically opposed locations from an inner circumferential surface 202 of the hub member 154 and that fit closely within the notches. The remaining two notches 198, which are also diametrically opposite one another, are formed with radially outwardly projecting tabs 199. These two notches 196 receive two resilient spring fingers 201 (only one of which is shown in FIG. 6) that also project radially inward at diametrically opposed locations from the inner circumferential surface 202 of the hub member 154. Because the spring fingers 201 are resilient, they can flex to move past the projecting tabs 199 and then snap back underneath the tabs 199. The hub member 154 is thus fixed or attached to the first end portion 38 of the spool 14 so as to rotate with the first end portion and also so as to be held against axial movement or movement along the central longitudinal axis 172 relative to the first end portion of the spool.

The inner circumferential surface 202 of the hub member 154 is an inner circumferential surface of a wall 206, which extends axially or along the central longitudinal axis 172. On the outer circumference of the wall 206 and the hub member 154 is a rim 204, which projects outward or radially relative to the central longitudinal axis 172. Together, the outwardly projecting rim 204 and the axially extending wall 206 of the hub member 154 form features that permit the actuation pawls 158a and 158b and the leaf springs 160a and 160b to be mounted on the hub member 154, as will be described below. The rim 204 and the wall 206 also form features that engage features on the inertia member 156 to connect or engage the hub member 154 to or with the inertia member 156, as will also be described below.

To help mount the actuation pawls 158a and 158b on the hub member 154, two mounting holes 208a, b (only one of which is shown in FIG. 6) are formed in the rim 204 at diametrically opposite positions. Adjacent to each of the mounting holes 208a, b, a socket 210a, b and a fan-shaped tab slot 212a, b are formed in the axially extending wall 206. Each of the actuation pawls 158a and 158b has an enlarged cylindrical shoulder 214a, b at one end and contoured tip 216a, b at its opposite end. A post 218a, b projects from each shoulder 214a, b in a direction approximately perpendicular to the length of each actuation pawl 158a, b. A fan-shaped tab 219a, b (only one of which is shown in FIG. 6) projects from each shoulder 214a, b in a radial direction. In order to mount each actuation pawl 158a, b on the hub member 154, the actuation pawl is positioned relative to the hub member such that the shoulder 214a, b is aligned with its corresponding socket 210a, b, the post 218a, b is aligned with its corresponding mounting hole 208a, b, and the fan-shaped tab 219a, b is aligned with the corresponding fan-shaped fab slot 212a, b. Moving each shoulder 214a, b into its corresponding socket 210a, b, each post 218a, b into its corresponding mounting hole 208a, b, and each fan-shaped tab 219a, b into its corresponding fan-shaped tab slot 212a, b mounts each actuation pawl 158a, b on the hub member 154. Subsequently pivoting the each actuation pawl 158a, b relative to the hub member 154 causes the fan-shaped tabs 219a, b to move into slots (not shown) in the hub member so that the actuation pawl is held in place on the hub member against axial movement or movement along the central longitudinal axis 172.

To mount the leaf springs 160a and 160b on the hub member 154, two U-shaped spring sockets 226a, b are formed in diametrically opposite positions in the axially extending wall 206. Each of the leaf springs 160a and 160b has a U-shaped hook 220a, b at one end and a contoured tip 222a, b at its opposite end. Adjacent each U-shaped hook 220a, b is a short, flexible mounting finger 224a, b that is spaced axially from and projects at a small angle radially outward from the remainder of each leaf spring 160a, b. To mount each leaf spring 160a, b on the hub member 164, the leaf spring is positioned relative to the hub member such that the U-shaped hook 220a, b is aligned with its corresponding spring socket 226a, b. Moving each U-shaped hook 220a, b into its corresponding spring socket 226a, b mounts each leaf spring 160a, b on the hub member 154. At the same time, each mounting finger 224a, b is moved under a corresponding clip 228a, b that projects axially from the rim 204 so that the leaf spring is held in place on the hub member 154 against axial movement or movement along the central longitudinal axis 172. When the leaf springs 160a, b are mounted on the hub member 154, the contoured tips 222a, b of the leaf springs engage and resiliently press against the actuation pawls 158a, b so that their respective contoured tips 216a, b are biased in outward directions or radially relative to the central longitudinal axis 172.

Positioned on the axially extending wall 206 between the socket 210a and the spring socket 226a, on the one hand, and between the socket 210b and the spring socket 226b, on the other hand, are features that engage features on the inertia member 156 to conned or engage the hub member 154 to or with the inertia member 156. Specifically, two slotted guides 230a, b are formed at diametrically opposite positions in the wall 206. Similarly, two latch members 232a, b project axially away from the rim 204 at diametrically opposite positions. Between each slotted guide 230a, b and its corresponding latch member 232a, b is a ramp 234a, b, which projects outwardly from the wall 206 or radially relative to the central longitudinal axis 172. Each ramp 234a, b has a moderately sloped surface 236a, b, an opposed sharply sloped surface 238a, b, and a flat radially innermost surface 237a, b, which is interposed between the moderately sloped surface and the sharply sloped surface.

The inertia member 156 includes a wall 240 that extends axially or along the central longitudinal axis 172. The wall 240 has two different heights or axial extents. A first, radially outer, greater height or axial extent terminates in an end surface 242. A second, radially inner, lesser height or axial extent terminates in an end surface 244, which effectively provides a step or ledge adjacent an inner circumference of the wall 240. Two gaps or windows 248a, b are formed in the wall 240 at diametrically opposite locations around the circumference of the inertia member 156. Between the windows 246a, b are two hooks 248a, b, which project from a radially inner circumferential surface 250 of the wall 240 in an inward direction or radially inward relative to the central longitudinal axis 172. Adjacent each of the hooks 248a, b are two tabs 252a, b and 254a, b, which also project from the radially inner circumferential surface 250 of the wall 240 in an inward direction or radially inward relative to the central longitudinal axis 172. Each tab 252a, b is located between its corresponding hook 248a, b and its corresponding tab 254a, b. Each tab 252a, b is also spaced apart around the radially inner circumferential surface 250 from its corresponding tab 254a, b. Each tab 254a, b has an axially extending wedge member 258a, b.

Figure 7:
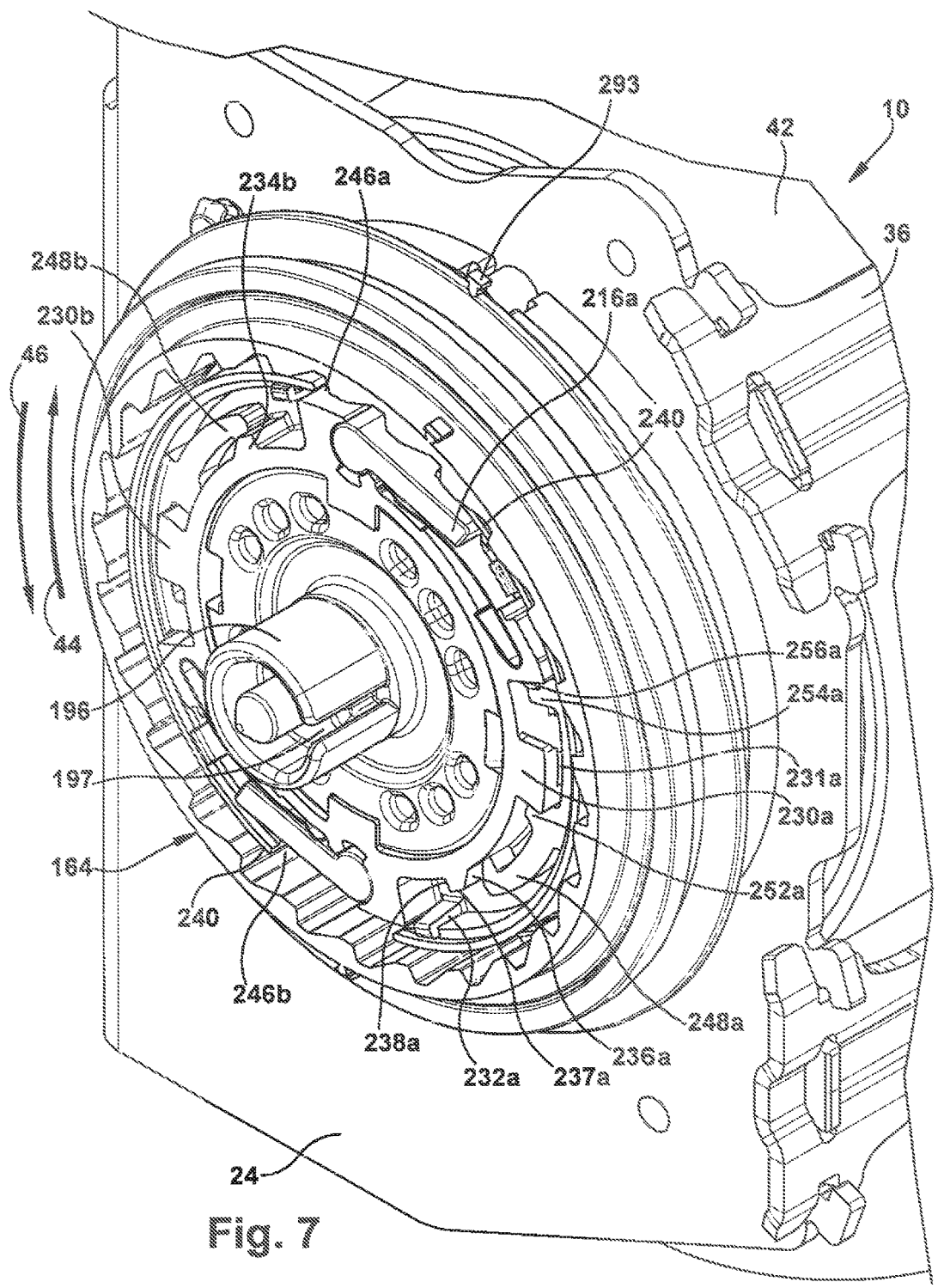
FIG. 7 is a view of certain components of FIG. 5 in a first relative orientation.

The wall 240 of the inertia member 156 has an inner diameter that is larger than the outer diameters of the rim 204 and the wall 206 of the hub member 154. The inertia member 156 may thus be positioned so as to surround the hub member 154. To so position the inertia member 156 relative to the hub member 154, however, the radially inwardly projecting hooks 248a, b and tabs 252a, b and 254a, b must be positioned to as to interfit with the slotted guides 230a, b and the ramps 234a, b. In particular, the tabs 252a, b and 254a, b must be positioned on opposite sides of the slotted guides 230a, b so that the slotted guide 230a is disposed between the tabs 252a and 254a and the slotted guide 230b is disposed between the tabs 252b and 254b. In normal circumstances or normal operation of the seat belt retractor 10, as shown in FIG. 7, the book 248a is positioned between the slotted guide 230a and the ramp 234a, and the hook 243b is positioned between the slotted guide 230b and the ramp 234b. In this relative position of the hub member 154 and the inertia member 158, the wall 240 of the inertia member is also positioned relative to the actuation pawls 158a, b such that the wall blocks or prevents the actuation pawls from pivoting in a radially outward direction under the bias of the leaf springs 160a, b. To hold the inertia member 156 in position axially or along the central longitudinal axis 172, the latch members 232a, b snap over the wall 240 at its radially inner, lesser height or axial extent so as to engage the end surface 244.

Although the inertia member 156 normally moves or rotates together with the hub member 154, and thus with the spool 14, the inertia member may move or rotate relative to the hub member. For example, if the pretensioner 20 is actuated, the spool 14 will be abruptly moved or rotated or accelerated in the webbing retraction direction 46. If the spool 14 is abruptly moved or rotated or accelerated in the webbing retraction direction 46, the inertia member 156 will tend to lag the rotational movement of the hub member 154 and thus will rotate relative to the hub member. With such relative rotational movement between the hub member 154 and the inertia member 156, each hook 248a, b of the inertia member will travel along the moderately sloped surface 236a, b of the corresponding ramp 234a, b of the hub member, across the Hat radially innermost surface 237a, b of the ramp, and down over the opposed sharply sloped surface 238a, b of the ramp. At the same time, each tab 254a, b of the inertia member 156 will move into the slot 231a, b of the corresponding slotted guide 230a, b and travel along the slot until the wedge member 258a, b of the tab 254a, b is wedged or frictionally engaged with the slotted guide. When the hooks 248a, b are engaged with the sharply sloped surfaces 238a, b of the ramps 234a, b and the wedge members 253a, b are engaged with the slotted guides 230a, b, further relative rotational movement between the hub member 154 and the inertia member 156 in both the webbing withdrawal direction 44 and the webbing retraction direction 46 is prevented and the hub member, and the inertia member may again rotate together.

Figure 8:
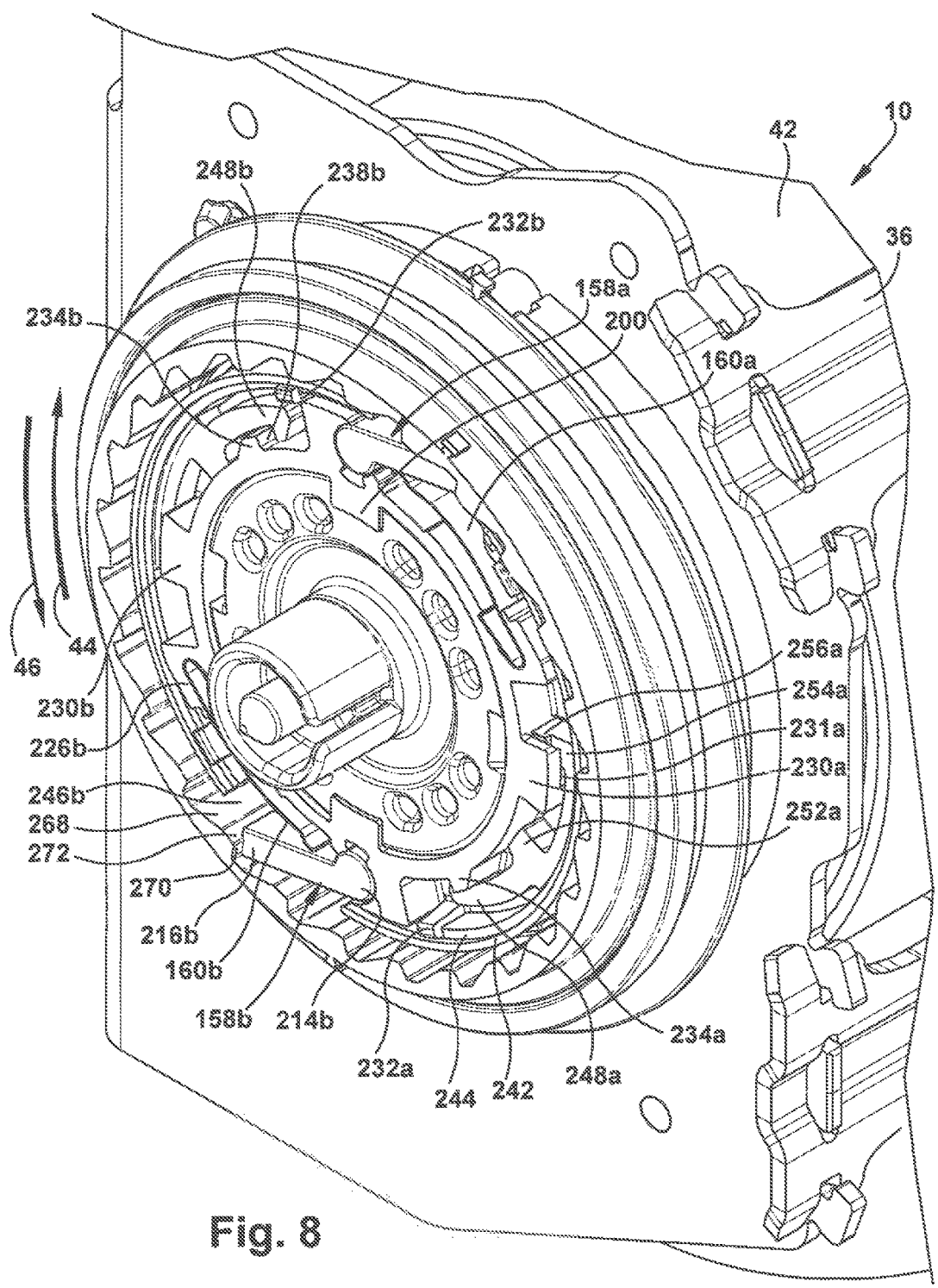
FIG. 8 is a view of the components of FIG. 7 in a second relative orientation.

The limited amount of relative rotation that has been permitted between the hub member 154 and the inertial member 156 is sufficient to cause the windows 246a, b in the wall 240 of the inertia member to rotate into alignment with the tips 216a, b of the actuation pawls 158a, b mounted on the hub member, as can be seen in FIG. 8. The leaf springs 160a, b are then able to bias the tips 216a, b of the actuation pawls 158a, b radially outward through the windows 248a, b into engagement with the count actuation member 164. Like the hub member 154, the count actuation member 164 includes a wall 260, which extends axially or along the central longitudinal axis 172, and a rim 262, which projects outward or radially relative to wall 260 and the central longitudinal axis 172. On a radially inner circumferential surface 264 of the wall 260 and the count actuation member 164 are a plurality of teeth 266, which project radially inward in an array arranged around the entire circumference of the inner circumferential surface 264. Each tooth 266 includes a moderately sloped surface 268, an opposed sharply sloped surface 270, and a flat radially innermost surface 272, which is interposed between the moderately sloped surface and the sharply sloped surface.

As can be seen in FIG. 8, when the tips 216a, b of the actuation pawls 158a, b project outwardly through the windows 246a, b of the inertia member 156, the tips engage the sharply sloped surfaces 270 of two teeth 266 on the count actuation member 164. As a result of such engagement, the hub member 154 and the inertia member 156 cannot rotate relative to the count actuation member 164 in the webbing withdrawal direction 44. Consequently, if the spool 14 rotates in the webbing withdrawal direction 44, the engagement of the actuation pawls 156a, b with the count actuation member 164 causes the count actuation member to rotate in the webbing withdrawal direction together with the spool and, as will be explained, causes initiation of a counting process regarding the rotation of the first end portion 178 of the torsion bar 150 relative to the second end portion 180 of the torsion bar. At the same time, the tips 216a, b of the actuation pawls 158a, b are able to move along the moderately sloped surfaces 268 of the teeth 266 of the count actuation member 164 and also along the flat radially innermost surfaces 272 of the teeth in the webbing retraction direction 46 so the spool 14 and the hub member 154 are free to rotate relative to the count actuation member 164 in the webbing retraction direction 46. From the foregoing description, it can be seen that the hub member 154, the inertia member 156, the actuation pawls 158a, b, and the leaf springs 160a, b comprise an actuation mechanism for actuating the counting process and a counting mechanism that comprises the count actuation member 164, the first and second count rings 162 and 163, and the locking mechanism 166.

Because the count actuation member 164 does not engage either the hub member 154 or the inertia member 156 in a manner that will hold the count actuation member in position axially relative to the hub member and the inertia member, the outwardly projecting rim 262 contacts or engages a corresponding annular surface (not shown) on the interior of the housing 52. The contact or engagement between the rim 262 and the annular surface (not shown) of the housing 52 will hold the count actuation member 164 against axial movement or movement along the central longitudinal axis 172 in a direction away from the frame 12 because the housing 52 is secured by the fasteners 54 to the side wall 24 of the frame 12. The count actuation member 164 is held against axial movement or movement along the central longitudinal axis 172 in a direction toward the frame 12 by engagement with other elements of the retractor 10, as will be explained below. Optional tabs 274 may be formed on the outer circumference of the wall 260 adjacent the rim 262 to engage corresponding slots or notches (not shown) in the housing 52 to help position the count actuation member 164 in a desired rotational orientation. The tabs 274 are frangible so that they will break away from the count actuation member 164 when the count actuation member begins to rotate.

Projecting from the outer circumference of the wall 260 adjacent the rim 262 on a side of the rim presented way from the housing 52 is a count actuation tab 276, which is shown in FIG. 6 out of its ordinary rotational position relative to the first and second count rings 162 and 163, in particular, for purposes of illustration only. The count actuation tab 276 is positioned to engage the first count ring 162. More specifically, the first count ring 162 includes a wall 280, which extends axially or along the central longitudinal axis 172, and a rim 282, which projects outward or radially relative to wall 260 and the central longitudinal axis 172. Like the outwardly projecting rim 262 of the count actuation member 164, the rim 282 contacts or engages a corresponding annular surface (not shown) on the interior of the housing 52. The contact or engagement between the rim 282 and the annular surface (not shown) of the housing 52 will hold the first count ring 162 against axial movement or movement along the central longitudinal axis 172 in a direction away from the frame 12 because the housing 52 is secured by the fasteners 54 to the side wall 24 of the frame 12. The first count ring 162 is held against axial movement or movement along the central longitudinal axis 172 in a direction toward the frame 12 by engagement with other elements of the retractor 10, as will be explained below.

The wall 280 of the first count ring 162 has a radially inner circumferential surface 284. Projecting radially inwardly from the radially inner circumferential surface 284 is a first counting tab 286. The first counting tab 286 projects radially inwardly to an extent sufficient to ensure that the count actuation tab 276 of the count actuation member 164 will engage the first counting tab 286. In their initial relative rotational orientations, the count actuation tab 276 is positioned adjacent the first counting tab 286 on a side of the first counting tab such that the count actuation tab 276 is free to rotate in the webbing withdrawal direction 44 relative to the first counting tab 286 through an arc of approximately 320° before the count actuation tab will contact, strike or engage with the first counting tab 286. When the count actuation tab 276 contacts, strikes or engages with the first counting tab 266 while rotating in the webbing withdrawal direction 44, the count actuation tab 276 will begin to push, drive or rotate the first counting tab 286 and thus the first count ring 162 in the webbing withdrawal direction 44.

The first counting tab 286 of the first count ring 162 is positioned to engage the second count ring 163. In particular, the second count ring 163 includes a wall 288, which extends axially or along the central longitudinal axis 172, an outer rim 290, which projects outward or radially relative to wall 288 and the central longitudinal axis 172, and an inner rim 292, which projects inward or radially relative to wall 288 and the central longitudinal axis 172. Like the outwardly projecting rim 262 of the count actuation member 164, the outer rim 290 of the second count ring 163 contacts or engages a corresponding annular surface (not shown) on the interior of the housing 52. The contact or engagement between the outer rim 290 and the annular surface (not shown) of the housing 52 will hold the second count ring 163 against axial movement or movement along the central longitudinal axis 172 in a direction away from the frame 12 because the housing 52 is secured by the fasteners 54 to the side wall 24 of the frame 12. Optional tabs 293 may be formed on a radially outer circumferential surface 294 of the wall 288 adjacent the outer rim 290 to engage corresponding slots or notches (not shown) in the housing 52 to help position the second count ring 163 in a desired rotational orientation. The tabs 293 are frangible so that they will break away from the second count ring 163 when the second count ring begins to rotate.

The outer rim 290 is also in contact with an axially innermost end of the wall 280 of the first count ring 162 and thereby holds the first count ring against axial movement or movement along the central longitudinal axis 172 in a direction toward the frame 12, in a similar manner, the inner rim 292 of the second count ring 183 is in contact with an axially innermost end of the wall 260 of the count actuation member 164 and thereby holds the count actuation member against axial movement or movement along the central longitudinal axis 172 in a direction toward the frame 12. The second count ring 163 is held against axial movement or movement along the central longitudinal axis 172 in a direction toward the frame 12 by engagement with other elements of the retractor 10, as will be explained below.

A second counting tab 296 projects outwardly or radially relative to the central longitudinal axis 172 from the radially outer circumferential surface 294 of the wall 288. The second counting tab 296 projects radially outwardly to an extent sufficient to ensure that the first counting tab 286 of the first count ring 162 will engage the second counting tab 296. In their initial relative rotational orientations, the first counting tab 286 is positioned adjacent the second counting tab 296 on a side of the second counting tab such that the first counting tab 286 is free to rotate in the webbing withdrawal direction 44 relative to the second counting tab 296 through an arc of approximately 320° before the first counting tab 286 will contact, strike or engage with the second counting tab 296. When the first counting tab 286 contacts, strikes or engages with the second counting tab 296 while rotating in the webbing withdrawal direction 44, the first counting tab 286 will begin to push, drive or rotate the second counting tab 296 and thus the second count ring 163 in the webbing withdrawal direction 44.

The wall 288 of the second count ring 163 also has a radially inner circumferential surface 298. Projecting radially outwardly from the radially inner circumferential surface 298 is a third counting tab 300. The third counting tab 300 projects radially inwardly to an extent sufficient to ensure that the third counting tab will engage the locking mechanism 166. In particular, the locking mechanism 166 includes a cage 302, a locking hub 304, three rollers 306, and three rivets 308. The cage 302, which is annular or ring-like in shape, may be formed of a plastic material. The cage 302 engages the rollers 306 and the locking hub 304, as will be explained below, and can cause the rollers to move relative to the locking hub. The rivets 303 secure the looking hub 304 to the side wall 24 of the frame 12.

The cage 302 includes a short wall 310, which extends axially or along the central longitudinal axis 172, and a rim 312, which projects outward or radially relative to wall 310 and the central longitudinal axis 172. The rim 312 of the cage 302 is in contact with an axially innermost end of the wall 288 of the second count ring 163 and thereby holds the second count ring against axial movement or movement along the central longitudinal axis 172 in a direction toward the frame 12. In a similar manner, the rim 312 of the cage 302 is in contact with the locking hub 304, which, in turn, is in contact with the side wall 24 of the frame 12 and thereby holds the count actuation member against axial movement or movement along the central longitudinal axis 172 in a direction toward the frame.

The wall 310 of the cage 302 has a radially outer circumferential surface 314. Projecting radially outwardly from the radially outer circumferential surface 314 is a lock actuation tab 316. The lock actuation tab 316 projects radially outwardly to an extent sufficient to ensure that the third counting tab 300 of the second count ring 163 will engage the lock actuation tab 316. In their initial relative rotational orientations, the third counting tab 300 is positioned adjacent the lock actuation tab 316 on a side of the lock actuation tab such that the third counting tab 300 is free to rotate in the webbing withdrawal direction 44 relative to the lock actuation tab 316 through an arc of approximately 260° before the third counting tab 300 will contact, strike or engage with the lock actuation tab 316. When the third counting tab 300 contacts, strikes or engages with the lock actuation tab 316 while rotating in the webbing withdrawal direction 44, the third counting tab 300 will begin to push, drive or rotate the lock actuation tab 316 and thus the cage 302 in the webbing withdrawal direction 44.

Figure 9:
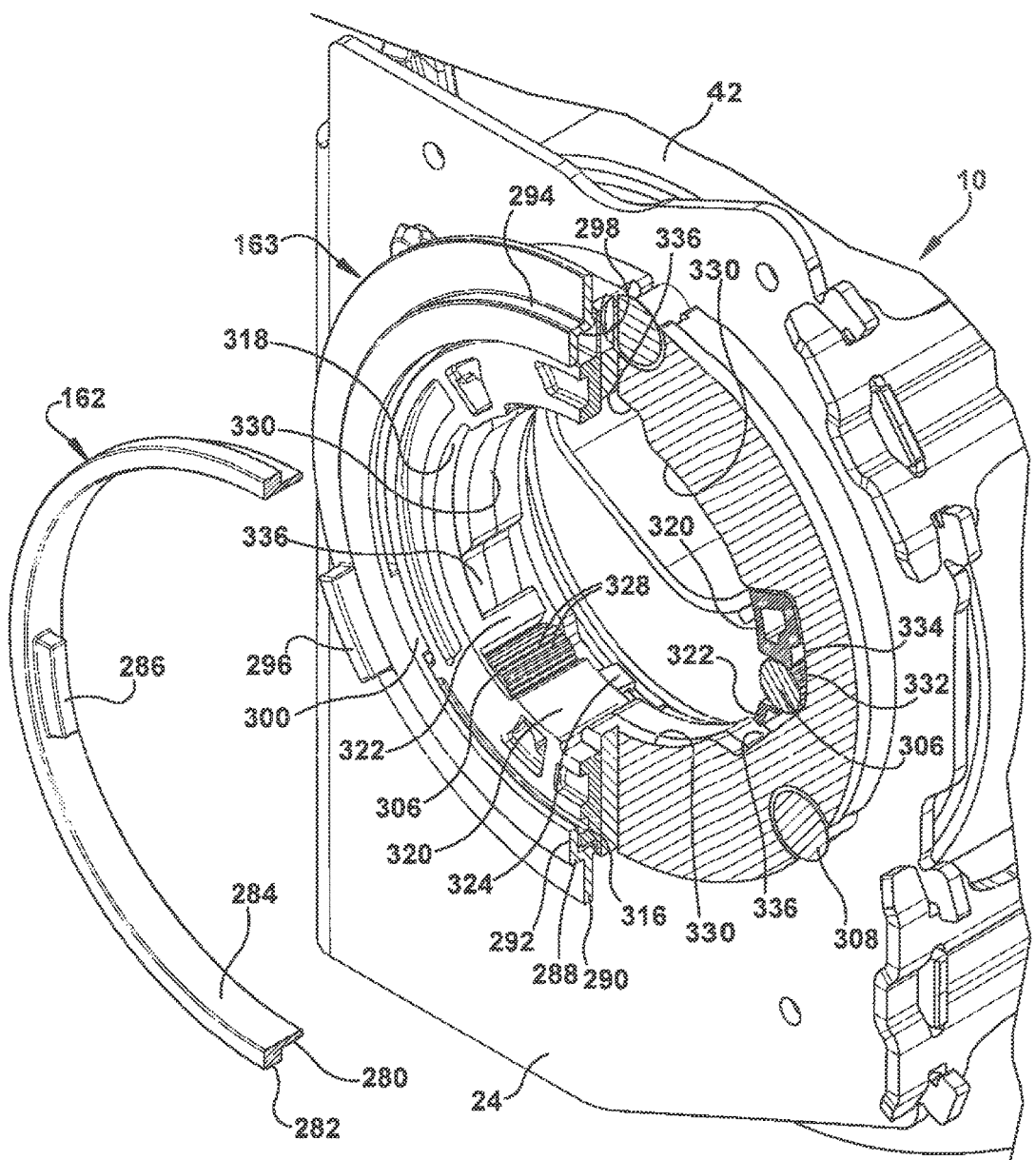
FIG. 9 is a sectional view through the side of the seat bait retractor shown in FIG. 5.

The wall 310 of the cage 302 also has a radially inner circumferential surface 318. Projecting axially from the wall 310 as extensions of the radially inner circumferential surface 318 are three, circumferentially spaced apart pushing posts 320 and three circumferentially spaced apart positioning posts 322, only two of which is shown in FIGS. 5 and 9. The pushing posts 320 and the positioning posts 322 project in a direction toward the side wall 24 of the frame 12. Each positioning post 322 is located adjacent a corresponding pushing post 320 and is spaced circumferentially away from the corresponding pushing post 320 by a distance approximately equal to the diameter of each of the rollers 306. Each roller 306 is captured between a pushing post 320 and its corresponding positioning post 322. At the distal end of each pushing post 320 is a small hook or clip 324, only one of which is shown in FIGS. 5 and 9. The three clips 324 snap over the edge of the locking hub 304 to secure or attach the cage 302 to the locking hub in an axial direction or along the central longitudinal axis 172. The three clips 324 still permit the cage 302 to move circumferentially or rotate relative to the locking hub 304. When the third counting tab 800 begins to push, drive or rotate the lock actuation tab 316 and thus the cage 302 in the webbing withdrawal direction 44, the pushing posts 320 will push each of the rollers 306 through a shod distance or arc in the webbing withdrawal direction.

The three rollers 306 are cylindrical in shape and have outer circumferential surfaces formed with axially extending splines or ribs 328. In addition to being captured between the pushing posts 320 and the positioning posts 322 of the cage 302, the rollers 306 are retained within the locking hub 304. The locking hub 304 is formed of a strong and relatively rigid material, such as steel, and has a central opening 187. The locking hub 304 may be formed as a single piece of material or, as shown, may be formed as multiple pieces, such as multiple stamped metal plates that are stacked on one another. The surface of the locking hub 304 that defines the central opening 167 includes three spool-engaging surface portions 330 and three ramp surface portions 332, which alternate with the spool-engaging surface portions around the central opening. The three spool-engaging surface portions 330 are arcuate in shape and fit closely around the large diameter outer circumferential surface 194 of the first end portion 38 of the spool 14. Each of the three ramp surface portions 332 includes a roller resting surface portion 334 and an adjacent roller locking surface portion 336. The rollers 306 may be positioned in contact with the roller resting surface portions 334 without also contacting the large diameter outer circumferential surface 194 of the first end portion 38 of the spool 14.

In normal operation of the retractor 10, the cage 302 is positioned relative to the locking hub 304 such that the rollers 306 are positioned and maintained against the roller resting surface portions 334 and free from contact with the large diameter outer circumferential surface 194 of the first end portion 38 of the spool 14. The spool 14 is thus free to rotate relative to the locking mechanism in either the webbing withdrawal direction 44 or the webbing retraction direction 46. When the third counting tab 300 begins to push, drive or rotate the lock actuation tab 316 and thus the cage 302 in the webbing withdrawal direction 44, however, the pushing posts 320 will push each of the rollers 306 away from its corresponding roller resting surface portion 334 and along the adjacent roller locking surface portion 336. Each roller looking surface portion 338 is inclined in a radial direction so as to be closer to the large diameter outer circumferential surface 194 of the first end portion 38 of the spool 14 as the distance from the roller resting surface portion 334 increases. Thus, as the rollers 306 move along the roller locking surfaces portions 336 away from the roller resting surface portions 334, the rollers will be forced into contact with the large diameter outer circumferential surface 194 of the first end portion 38 of the spool 14 and the splines 328 on the rollers will dig into the large diameter outer circumferential surface 194 of the first end portion 38 of the spool 14. As the splines 328 on the rollers 306 dig into the large diameter outer circumferential surface 194 of the first end portion 38 of the spool 14, rotational movement of the spool 14 relative to the locking mechanism 186 and thus the frame 12 will be prevented, and the retractor 10 will be locked.

In use, when the retractor 10 is installed in a vehicle (not shown), a vehicle occupant (not shown) will grasp a buckle tongue (not shown) that is attached to the seat belt webbing 42 wound on the spool 14 of the retractor and will pull the buckle tongue and the webbing away from the retractor in order to don the seat belt by drawing the seat belt webbing across the occupant's body and connecting the buckle tongue to a buckle (not shown). As the seat belt webbing 42 is pulled away from the retractor 10, the webbing unwinds from the spool 14 and rotates the spool in the webbing withdrawal direction 44. Because the spool 14 is connected to the torsion bar 150, and the torsion bar is connected to the spool disc 68, rotation of the spool effects rotation of the spool disc 68 in the webbing withdrawal direction 44. Rotation of the spool disc 68, in turn, effects corresponding rotation of the inertia disc 64 due to the low acceleration or rate of change of velocity of the spool disc 68 as the seat belt webbing 42 is being unwound from the spool 14 by the vehicle occupant. Because there is no relative rotation between the spool disc 68 and the inertia disc 64, the locking pawl 66 will remain out of contact with the frame teeth 106 in the supplemental frame member 32.

After the seat belt has been donned by the vehicle occupant (not shown), subsequent low acceleration, low speed withdrawal and retraction movements of the seat belt webbing 42 in a non-crash condition of the vehicle, as, for example, when the vehicle occupant adjusts his or her position in a vehicle seat (not shown), will produce low acceleration rotational movements of the spool 14 and consequent joint rotational movements of the spool disc 68 and the inertia disc 64. Again, because there is no relative rotation between the spool disc 68 and the inertia disc 64, the locking pawl 66 will remain out of contact with the frame teeth 106 in the supplemental frame member 32.

If the vehicle occupant moves more rapidly, however, such as may occur in a low speed collision, the load applied to the seat belt webbing 42 by the occupant's body may produce higher speed and higher acceleration withdrawal movements of the seat belt webbing 42 and higher acceleration rotational movements of the spool 14. If such higher acceleration movements of the spool 14 exceed a predetermined low spool acceleration threshold, the spool movements will cause the spool disc 68 to accelerate relative to the inertia disc 64, thereby resulting in rotation of the inertia disc to lag rotation of the spool disc and effectively resulting in relative rotation between the spool disc and the inertia disc. The locking teeth 96 of the locking pawl 66 will then pivot into contact with the frame teeth 106 in the supplemental frame member 32 and prevent further rotation of the spool disc 66 and the spool 14 in the webbing withdrawal direction 44. Provided such higher acceleration movements of the spool 14 do not exceed a predetermined high spool acceleration threshold, and provided also that other conditions do not result in actuation of the pretensioner 20 and the load limiting system 22, rotational movement of the spool in the webbing withdrawal direction 44 will be blocked as described above.

In a similar manner, if the vehicle (not shown) in which the retractor 10 is mounted decelerates rapidly, such as may occur in a low speed collision, the inertia weight 74 may move in and relative to the weight support 72, thereby causing the sensor lever 76 to pivot and produce upward pivoting of the lock-up lever 62 into engagement with the ratchet teeth 88 of the inertia disc 64. Engagement between the lock-up lever 62 and the ratchet teeth 88 of the inertia disc 64 will prevent the inertia disc 84 from rotating with the spool disc 68 and thereby cause relative rotation between the inertia disc and the spool disc if there is any rotation of the spool 14 in the webbing withdrawal direction 44. The locking teeth 96 of the locking pawl 66 will then pivot into contact with the frame teeth 106 in the supplemental frame member 32 and prevent further rotation of the spool disc 68 and the spool 14 in the webbing withdrawal direction 44. Such movement of the inertia weight 74 in and relative to the weight support 72 will occur if the vehicle deceleration exceeds a predetermined low vehicle deceleration threshold. Provided such vehicle deceleration does not exceed a predetermined high vehicle deceleration threshold, and provided also that other conditions do not result in actuation of the pretensioner 20 and the load limiting system 22, rotational movement of the spool in the webbing withdrawal direction 44 will be blocked as described above.

In a situation in which a more serious crash condition of the vehicle (not shown) is experienced or anticipated, the pretensioner 20 and the load limiting system 22 may be actuated. The pretensioner 20 may be actuated in response to a vehicle sensor (not shown), such as an accelerometer mounted in a forward location in the vehicle, detecting a rapid deceleration of the vehicle, such as a deceleration exceeding the predetermined high vehicle deceleration threshold, indicating the actual occurrence of a serious vehicle crash condition. The pretensioner 20 may alternatively or additionally be actuated in response to a vehicle sensor (not shown), such as a forward-looking radar unit or a forward-looking camera, detecting an anticipated and potentially unavoidable serious vehicle crash condition. The pretensioner 20 may alternatively or additionally be actuated in response to a vehicle sensor (not shown), such as a camera or a capacitive sensor directed toward or located adjacent to the vehicle occupant, detecting movement of the vehicle occupant indicating the actual occurrence of a serious vehicle crash condition. Any desired system or mechanism may be used to determine whether and when to actuate the pretensioner 20, provided the pretensioner is anticipated to be actuated in sufficient time to assist or help in protecting the vehicle occupant.

When actuated, the pretensioner 20 operates to remove slack from the seat belt webbing 42 wound on the spool 14 and also to pull the seat belt webbing close to and against a vehicle occupant (not shown). Actuation of the pretensioner 20 starts with actuation of the micro gas generator 114. The micro gas generator 114 may be actuated by an electrical signal sent from a sensor or by an electrical signal resulting from an electrical circuit being completed by a sensor. Although the micro gas generator 114 is shown as electrically actuated, the micro gas generator may be mechanically actuated. When actuated, the micro gas generator 114 produces or generates gas, which pushes the elongated flexible member or snake 116 against the vanes 120 of the turbine wheel 110, thereby rotating the turbine wheel 110 in the webbing retraction direction 46. Rotation of the turbine wheel 110 is transmitted to the spool 14 via the spool disc 68, the end portion 180 of the torsion bar 150, and the remainder of the load limiting system 22 and thereby causes the spool 14 to rotate in the webbing retraction direction 46 to wind up the seat belt webbing 42 on the spool. Such winding rotation of the spool 14 effectively reduces or eliminates slack in the seat belt webbing 42 wound on the spool and also pulls the seat belt webbing closely and tightly against the vehicle occupant (not shown).

Actuation of the pretensioner 20 actuates the load limiting system 22 by producing abrupt and high acceleration of the spool 14 in the webbing retraction direction 46. The high acceleration of the spool 14 in the webbing retraction direction 46 causes relative rotation between the hub member 154 and the inertia member 156. With such relative rotational movement between the hub member 154 and the inertia member 156, the windows 246a, b in the wall 240 of the inertia member to rotate into alignment with the tips 216a, b of the actuation pawls 168a, b mounted on the hub member. The leaf springs 160a, b then bias the tips 216a, b of the actuation pawls 156a, b radially outward through the window 246a, b into engagement with the teeth 266 of the count actuation member 164. As a result of such engagement, the hub member 164 and the inertia member 156 cannot rotate relative to the count actuation member 164 in the webbing withdrawal direction 44. Consequently, if the spool 14 thereafter rotates in the webbing withdrawal direction 44 during the vehicle crash condition, the engagement of the actuation pawls 158a, b with the count actuation member 164 causes the count actuation member to rotate in the webbing withdrawal direction together with the spool and initiates of a process of "counting" the number of rotations of the first end portion 178 of the torsion bar 150 relative to the second end portion 180 of the torsion bar.

If the vehicle (not shown) in which the retractor 10 is mounted is subjected to a serious crash condition during or after actuation of the pretensioner 20, the vehicle occupant (not shown) will move against the seat belt webbing 42, which extends across the body of the vehicle occupant. Such movement of the body of the vehicle occupant, after operation of the pretensioner is completed, will impose a load on the seat belt webbing 42 and cause acceleration of the spool 14 of the retractor 10 in the webbing withdrawal direction 44. Such acceleration of the spool will ensure that the locking teeth 96 of the locking pawl 68 are engaged with the frame teeth 106 in the supplemental frame member 32 to prevent further rotation of the spool disc 68 and the second end portion 130 of the torsion bar 150 on which the spool disc is mounted in the webbing withdrawal direction 44. Because the vehicle (not shown) is being subjected to a serious vehicle crash condition, however, the load on the seat belt webbing 42 is likely to be sufficient to cause rotation of the spool 14 in the webbing withdrawal direction 44 through rotation of the first end portion 178 of the torsion bar 150 relative to the second end portion 180 end consequent twisting of the torsion bar.

With such rotation of the first end portion 178 of the torsion bar 150 relative to the second end portion 180 and with the actuation pawls 158a, b engaging the count actuation member 164 due to actuation of the pretensioner 20, the stop assembly 152 will both "count" and limit the number of rotations of the first end portion 178 of the torsion bar 150 relative to the second end portion 180 of the torsion bar and thus limit twisting of the torsion bar. Specifically, rotation of the spool 14 in the webbing withdrawal direction 44 under the foregoing circumstances will cause the hub member 154, the inertia member 156, and the count actuation member 164 to rotate in the webbing withdrawal direction 44. Rotation of the count actuation member 164 will produce movement of the count actuation tab 276 through an arc of 320° into contact with the first counting tab 286 on the first count ring 162. As the count actuation member 164 continues to rotate in response to rotation of the first end portion 38 of the spool 14, the count actuation tab 276 will push the first counting tab 286 and the first count ring 162 through an additional arc of 320° into contact with the second counting tab 296 on the second count ring 163. As the count actuation member 164 further continues to rotate in response to rotation of the first end portion 38 of the spool 14, the count actuation tab 276 will push the first counting tab 286, the first count ring 162, the second counting tab 296, and the second count ring 163 through an additional arc of 260° until the third counting tab 300 on the second count ring 163 contacts, strikes or engages with the lock actuation tab 316 on the cage 302 of the looking mechanism 186.

Further rotation of the count actuation member 164 in response to rotation of the first end portion 38 of the spool 14 will cause the count actuation tab 276 to push the first counting tab 286, the first count ring 162, the second counting tab 296, the second count ring 163, the third counting tab 300, the lock actuation tab 316, and the cage 302 in the webbing withdrawal direction 44. As the cage 302 rotates in the webbing withdrawal direction, the pushing posts 320 will push each of the rollers 306 away from its corresponding roller resting surface portion 334, along the adjacent roller locking surface portion 336, and into contact with the large diameter outer circumferential surface 194 of the first end portion 38 of the spool 14. As the splines 328 on the rollers 306 dig into the large diameter outer circumferential surface 184 of the first end portion 38 of the spool 14, rotational movement of the spool 14 relative to the locking mechanism 166 and thus the frame 12 will be stopped and prevented, and the retractor 10 will be locked.

Although the retractor 10 is described as including two count rings 162 and 163, the retractor may include a greater or lesser number of count rings. The retractor 10 may also include no count rings at all. Similarly, while the count actuation member 164 and the first count ring 162 are described as being rotatable through arcs of 320° and while the second count ring 163 is described as being rotatable through an arc of 260°, the actuation member 164 and the first and second count rings 162 and 163 may be rotatable through smaller arcs or, potentially, slightly greater arcs. Adjusting the arcs through which the actuation member 184 and the first and second count rings 162 and 163 are rotatable may be accomplished by changing the arcuate lengths of the count actuation tab 276 and/or the first, second and/or third counting tabs 286, 296, and 300 (or, in other words, the lengths the count actuation tab 276 and/or the first second and/or third counting tabs 286, 296, and 300 about the circumferences of the actuation member 164 and the first and second count rings 162 and 163). Adjusting the arcs through which the actuation member 164 and the first and second count rings 162 and 163 are rotatable may also or alternatively be accomplished by adjusting the starting positions of the actuation member 164, the first count ring 162, the second count ring 163 and/or the cage 302 and thus the count actuation tab 276, the first counting tab 286, the second counting tab 296, the third counting tab 300, and/or the lock actuation tab 316 relative to one another.

Actuation of the load limiting system 22 and, more particularly, actuation of relative rotational movement of the count actuation member 164, the first and second count rings 162 and 163, and the locking mechanism 166 is described above as both (a) occurring or being initiated on or upon the circumstance or occasion or occurrence of actuation of the pretensioner and (b) occurring as a result of or being effected or caused by actuation of the pretensioner 20. More particularly, actuation of the load limiting system 22 and, specifically, actuation of relative rotational movement of the count actuation member 164, the first and second count rings 162 and 163, and the locking mechanism 166 is described above as being caused by relative rotation between the hub member 154 and the inertia member 156 resulting from acceleration of the spool 14 by the pretensioner. Nonetheless, the load limiting system 22 might be actuated upon the actuation of the pretensioner 20 without also be actuated by the actuation of the pretensioner. For example, the electrical signal that actuates the micro gas generator 114 could also be used to actuate an electro-mechanical linkage to produce relative movement between the hub member 154 and the inertia member 156, thereby resulting in the load limiting system being actuated by the same input as the pretensioner without also being actuated as a result of actuation of the pretensioner.

Alternatively, other mechanisms and methods may used to cause the load limiting system 22 to be actuated by actuation of the pretensioner 20. For example, rather than have the pretensioner 20 cause relative rotation between the hub member 154 and the inertia member 156 through high acceleration rotation of the spool 14, movement of the elongated flexible member or snake 116 of the pretension could be used, directly or indirectly, to shift the position of the hub member 154 and/or the inertia member 156 and thereby to allow the actuation pawls 153a, b to engage the count actuation member 164 so as to actuate the load limiting system 22.

From the above description of the invention, those skilled in the art will perceive improvements, changes and modifications. Such improvements, changes, and/or modifications within the skill of the art are intended to be covered by the appended claims.

Having described the invention, the following is claimed:

1. A seat belt retractor comprising:
   (a) a rotatable spool on which seat belt webbing is wound, the spool being rotatable in a webbing withdrawal direction and an opposite webbing retraction direction;
   (b) a pretensioner actuatable to rotate the spool in the webbing retraction direction; and (c) a load-limiting system to limit a load applied to a vehicle occupant by the seat belt webbing, the load-limiting system including
   (i) a torsion bar mounted such that the torsion bar is twisted when a load in excess of a predetermined load is applied to the spool in the webbing withdrawal direction by the seat belt webbing, and
   (ii) a stop assembly actuatable to limit rotation of the spool in the webbing withdrawal direction to a predetermined number of rotations while the torsion bar is being twisted, the stop assembly being actuated upon actuation of the pretensioner.

2. The seat belt retractor according to claim 1 wherein the stop assembly includes
   (A) an actuation mechanism rotatable with the spool, a portion of the actuation mechanism being rotatable relative to the spool upon actuation of the pretensioner, and
   (B) a counting mechanism actuatable to count the predetermined number of rotations, the counting mechanism being actuated by rotation of the portion of the actuation mechanism relative to the spool.

3. The seat belt retractor according to claim 2 wherein the actuation mechanism includes
   (I) a hub member attached to the spool for rotation with the spool, and
   (II) an inertia member releasably connected to the hub member in a first orientation relative to the hub member, the inertia member being released from the hub member for limited rotational movement to a second orientation relative to the hub member upon actuation of the pretensioner, the inertia member being the portion of the actuation mechanism rotatable relative to the spool.

4. The seat belt retractor according to claim 3 wherein the actuation mechanism also includes
   (III) at least one actuation pawl pivotally mounted on the hub member, and
   (IV) at least one spring resiliently biasing the at least one actuation pawl in a radially outward direction relative to the hub member.

5. The seat belt retractor according to claim 4 wherein the inertia member includes a wall that blocks pivotal movement of the at least one actuation pawl in a radially outward direction relative to the hub member when the inertia member is disposed in the first orientation relative to the hub member, the wall including at least one window through which the at least one actuation pawl can pivot in a radially outward direction when the inertia member is disposed in the second orientation relative to the hub member.

6. The seat belt retractor according to claim 4 wherein the counting mechanism includes
   (I) a count actuation member rotatable with the spool in the webbing withdrawal direction to count at least partially the predetermined number of rotations, and
   (II) a locking mechanism that blocks rotation of the count actuation member with the spool in the webbing withdrawal direction after the predetermined number of rotations, the locking mechanism also blocking rotation of the spool in the webbing withdrawal direction to stop twisting of the torsion bar.

7. The seat belt retractor according to claim 6 wherein the at least one actuation pawl pivots relative to the hub member to engage the count actuation member when the inertia member is released from the hub member and rotates to the second orientation relative to the hub member upon actuation of the pretensioner, engagement of the at least one actuation pawl with the count actuation member initiating counting of the predetermined number of rotations when the spool is rotated in the webbing withdrawal direction.

8. The seat belt retractor according to claim 2 wherein the counting mechanism of the stop mechanism includes
   (I) a count actuation member rotatable with the spool in the webbing withdrawal direction to count at least partially the predetermined number of rotations, and
   (II) a locking mechanism that blocks rotation of the count actuation member in the webbing withdrawal direction after the predetermined number of rotations, the locking mechanism also blocking rotation of the spool in the webbing withdrawal direction to stop twisting of the torsion bar.

9. The seat belt retractor according to claim 1 wherein the stop assembly is actuated by actuation of the pretensioner.

10. The seat belt retractor according to claim 1 wherein the stop assembly limits twisting of the torsion bar.

11. A method for limiting a load applied to a vehicle occupant by seat belt webbing in a vehicle crash condition, the method comprising the steps of:
   (a) winding seat belt webbing on a rotatable spool of a seat belt retractor;
   (b) actuating a pretensioner to rotate the spool in a webbing retraction direction in response to an actual or anticipated crash event involving a vehicle in which the seat belt retractor is mounted;
   (c) twisting a torsion bar; and
   (d) actuating a stop assembly upon actuation of the pretensioner to limit rotation of the spool in a webbing withdrawal direction to a predetermined number of rotations while the torsion bar is being twisted.

12. The method according to claim 11 wherein the stop assembly includes an actuation mechanism rotatable with the spool and wherein the step of actuating the stop assembly includes rotating a portion of the actuation mechanism relative to the spool upon actuation of the pretensioner.

13. The method according to claim 12 wherein the stop assembly also includes a counting mechanism and wherein the step of actuating the stop assembly includes actuating the counting mechanism to count the predetermined number of rotations.

14. The method according to claim 13 wherein the actuation mechanism includes a hub member attached to the spool for rotation with the spool and an inertia member releasably connected to the hub member in a first orientation relative to the hub member, the inertia member being released from the hub member for limited rotational movement to a second orientation relative to the hub member upon actuation of the pretensioner, the step of actuating the stop assembly including rotating the inertia member relative to the hub member into the second orientation.

15. The method according to claim 11 wherein the stop assembly limits twisting of the torsion bar.

* * * * *